US010400710B2

(12) United States Patent
Dawson et al.

(10) Patent No.: US 10,400,710 B2
(45) Date of Patent: Sep. 3, 2019

(54) SECONDARY NOZZLE FOR JET ENGINE

(71) Applicant: GENERAL ELECTRIC COMPANY, Schenectady, NY (US)

(72) Inventors: David Lynn Dawson, Liberty Township, OH (US); Erin Lee Lariviere, Milford, OH (US); Brian Joseph Petersen, Mason, OH (US); Robert Jerome Ellerhorst, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 702 days.

(21) Appl. No.: 13/889,003

(22) Filed: May 7, 2013

(65) Prior Publication Data
US 2014/0345254 A1 Nov. 27, 2014

(51) Int. Cl.
*F02K 3/077* (2006.01)
*F02K 3/12* (2006.01)
(Continued)

(52) U.S. Cl.
CPC ............ *F02K 3/077* (2013.01); *F02K 1/1292* (2013.01); *F02K 1/822* (2013.01); *F02K 3/025* (2013.01);
(Continued)

(58) Field of Classification Search
CPC . F02K 3/077; F02K 3/075; F02K 3/02; F02K 3/025; F02K 1/06; F02K 1/12; F02K 1/1207
See application file for complete search history.

(56) References Cited

U.S. PATENT DOCUMENTS

| 2,940,252 A | 6/1960 | Reinhart |
| 3,210,934 A | 10/1965 | Smale |

(Continued)

FOREIGN PATENT DOCUMENTS

| EP | 1895142 A2 | 3/2008 |
| EP | 1939437 A2 | 7/2008 |

OTHER PUBLICATIONS

PCT Search Report and Written Opinion issued in connection with corresponding Application No. PCT/US2014/035499 dated Feb. 10, 2015

(Continued)

*Primary Examiner* — William H Rodriguez
*Assistant Examiner* — Thomas P Burke
(74) *Attorney, Agent, or Firm* — General Electric Company; William Scott Andes

(57) ABSTRACT

A third stream duct producing a third air stream at reduced pressure that is exhausted through a separate nozzle that is concentric with the main or primary engine nozzle. The third stream exhaust air from the separate concentric nozzle is exhausted to a location at which pressure is ambient or sub-ambient. The location at which the third stream air is exhausted contributes to the thrust of the aircraft. The airstream from the third air duct is exhausted through an exhaust nozzle of the third duct that is positioned at the interface between the aft of the airframe and the leading edge of the engine outer flaps. This location is a low pressure region that has a recirculation zone. The exhaust of third stream air to this low pressure region substantially reduces or eliminates this recirculation zone and associated boat tail drag, thereby improving the efficiency of the engine.

20 Claims, 7 Drawing Sheets

(51) Int. Cl.
*F02K 3/02* (2006.01)
*F02K 3/075* (2006.01)
*F02K 1/12* (2006.01)
*F02K 1/82* (2006.01)

(52) U.S. Cl.
CPC ............ *F02K 3/075* (2013.01); *Y02T 50/672* (2013.01); *Y02T 50/675* (2013.01)

(56) References Cited

U.S. PATENT DOCUMENTS

| | | | |
|---|---|---|---|
| 3,296,800 A | | 1/1967 | Keenan et al. |
| 3,449,914 A | | 6/1969 | Brown |
| 3,792,584 A | | 2/1974 | Klees |
| 3,841,091 A | | 10/1974 | Sargisson et al. |
| 3,854,286 A | | 12/1974 | Klees |
| 3,879,941 A | | 4/1975 | Sargisson |
| 3,886,737 A | * | 6/1975 | Grieb ...................... F02K 3/077 181/220 |
| 3,910,375 A | | 10/1975 | Hache et al. |
| 3,915,413 A | | 10/1975 | Sargisson |
| 3,970,252 A | | 7/1976 | Smale et al. |
| 3,979,065 A | * | 9/1976 | Madden .................... F02K 1/12 239/127.3 |
| 3,981,143 A | | 9/1976 | Ross et al. |
| 3,990,638 A | | 11/1976 | Johnson |
| 4,004,416 A | | 1/1977 | Amelio et al. |
| 4,010,608 A | | 3/1977 | Simmons |
| 4,026,472 A | | 5/1977 | Rabone |
| 4,043,121 A | | 8/1977 | Thomas et al. |
| 4,050,242 A | | 9/1977 | Dusa |
| 4,064,692 A | * | 12/1977 | Johnson ................... F02K 3/075 60/262 |
| 4,066,214 A | | 1/1978 | Johnson |
| 4,069,661 A | | 1/1978 | Rundell et al. |
| 4,081,137 A | * | 3/1978 | Sutton ...................... F02K 1/12 239/127.3 |
| 4,086,761 A | | 5/1978 | Schaut et al. |
| 4,095,417 A | | 6/1978 | Banthin |
| 4,136,518 A | | 1/1979 | Hurley et al. |
| 4,214,441 A | | 7/1980 | Mouritsen et al. |
| 4,290,262 A | | 9/1981 | Wynosky et al. |
| 4,544,098 A | * | 10/1985 | Warburton ............ F02K 1/1223 239/127.3 |
| 4,791,783 A | | 12/1988 | Neitzel |
| 4,993,663 A | | 2/1991 | Lahti et al. |
| 5,054,288 A | | 10/1991 | Salemann |
| 5,058,617 A | | 10/1991 | Stockman et al. |
| 5,074,118 A | | 12/1991 | Kepler |
| 5,261,227 A | | 11/1993 | Giffin, III |
| 5,402,963 A | | 4/1995 | Carey et al. |
| 5,404,713 A | | 4/1995 | Johnson |
| 5,720,434 A | * | 2/1998 | Vdoviak .................. F02K 1/12 239/127.1 |
| 6,502,383 B1 | * | 1/2003 | Janardan ................ F02K 1/386 181/213 |
| 7,614,210 B2 | | 11/2009 | Powell et al. |
| 2005/0047942 A1 | | 3/2005 | Grffin et al. |
| 2005/0126174 A1 | * | 6/2005 | Lair ...................... F01D 17/105 60/771 |
| 2005/0188676 A1 | * | 9/2005 | Lair .......................... F02K 1/30 60/226.3 |
| 2005/0204742 A1 | * | 9/2005 | Lair .......................... F02K 1/06 60/770 |
| 2007/0000232 A1 | * | 1/2007 | Powell ...................... F02C 3/13 60/204 |
| 2007/0186535 A1 | * | 8/2007 | Powell ...................... F02K 1/08 60/226.1 |
| 2008/0141655 A1 | | 6/2008 | Johnson et al. |
| 2008/0141676 A1 | * | 6/2008 | Johnson ................. F02K 3/075 60/785 |
| 2010/0107600 A1 | * | 5/2010 | Hillel ..................... F01D 17/08 60/235 |
| 2012/0167549 A1 | | 7/2012 | Lariviere et al. |
| 2012/0321448 A1 | * | 12/2012 | Pesyna ................... F02K 3/077 415/145 |

OTHER PUBLICATIONS

International Search Report and Written Opinion issued in connection with corresponding PCT Application No. PCT/US2014/035497 dated Feb. 11, 2015.

U.S. Non-Final Office Action issued in connection with related U.S. Appl. No. 13/888,967 dated Sep. 1, 2015.

Unofficial English translation of Office Action and Search Report issued in connection with corresponding Application No. 201480026254.9 dated Aug. 30, 2016.

David Lynn Dawson et al., filed May 7, 2013, U.S. Appl. No. 13/888,967.

* cited by examiner

INCREASING PRESSURE

US 10,400,710 B2

SECONDARY NOZZLE FOR JET ENGINE

CROSS-REFERENCE TO RELATED APPLICATIONS

This application is related to application No. 13/888,967, which was filed with the U.S. Patent and Trademark Office on even date as the present application and is incorporated herein by reference.

FIELD OF THE INVENTION

The present invention is directed to a three stream turbofan engine, and specifically to exhausting third stream flow over a low pressure region.

BACKGROUND OF THE INVENTION

Most aircraft engines finding use in military applications, such as air combat, reconnaissance and surveillance, are augmented turbofans. Augmentation provides additional thrust for the aircraft when called upon, that is, on-demand.

All turbofan engines include at least two air streams. All air utilized by the engine initially passes through a fan, and then it is split into the two air streams. The inner air stream is referred to as core air and passes into the compressor portion of the engine, where it is compressed. This air then is fed to the combustor portion of the engine where it is mixed with fuel and the fuel is combusted. The combustion gases then are expanded through the turbine portion of the engine, which extracts energy from the hot combustion gases, the extracted energy being used to run the compressor and the fan and to produce electrical power to operate accessories. The remaining hot gases then flow into the exhaust portion of the engine, producing the thrust that provides forward motion to the aircraft.

The outer air flow stream bypasses the engine core and is pressurized by the fan. No other work is done on the outer air flow stream which continues axially down the engine but outside the core. The bypass air flow stream also can be used to accomplish aircraft cooling by the introduction of heat exchangers in the fan stream. Downstream of the turbine, the outer air flow stream is used to cool the exhaust system. When additional thrust is required (demanded), some of the fan bypass air flow stream is redirected to the augmenter where it is mixed with core flow and fuel to provide the additional thrust to move the aircraft.

At the rear of the exhaust, a convergent-divergent (C-D) nozzle sets the correct back pressure so that the core runs optimally. The C-D nozzle accomplishes this by choking the gas flow through the nozzle throat, A8, and varying A8 as required to set the required mass flow.

Certain variable cycle aircraft engines achieve relatively constant airflow as thrust is varied by changing the amount of fan bypass flow utilizing a third duct. Aircraft utilizing these variable cycle engines are able to maintain inlet airflow at subsonic power settings more efficiently and over a broader flight envelope. One particular type of variable cycle engine is referred to as a FLADE™ engine, FLADE™ being an acronym for "blade-on-fan" and is characterized by an outer fan duct which flows air into a third air duct, the outer fan duct being generally co-annular with, and circumscribing the inner fan duct, which in turn, is co-annular and circumscribes the core. This third airstream is pressurized by a blade-on-fan arrangement as set forth in prior art FLADE™ disclosures. The FLADE™ blades are radially outward of and directly connected to rotating fan blades, the fan blades assembled to a disk mounted on a shaft. The position of the FLADE™ is a design consideration, the design selected based on the temperature and pressure of the FLADE™ air (third stream air) desired. The trade-off is based on the fact that a higher pressure of FLADE™ operating air produces FLADE™ operating air with a higher temperature. U.S. Pat. No. 5,404,713 issued to Johnson on Apr. 11, 1995, assigned to the Assignee of the present invention and incorporated herein by reference.

In these variable cycle designs, the inlet air can be split to form a third stream of air, which is in addition to the bypass and core. This third stream of air may be provided at a lower temperature and pressure than either the core air stream or the bypass air stream discussed above. The pressure of this third stream of air can be increased, while still maintaining it at a temperature and pressure below the bypass air stream, using the blade-on-fan or FLADE™ airfoil and duct. Prior art third stream air flows have been exhausted into the core exhaust either just fore or aft of the C-D nozzle. However, placement of heat exchangers within the third air stream in recent embodiments to take advantage of the low temperatures of the air flowing in the third stream duct or FLADE™ duct have resulted in pressure drops of the air in the third stream duct or FLADE™ duct. The changes in pressure by the introduction of heat exchangers have resulted in the inability to exhaust the third stream air into the core exhaust at conditions in which exhaust pressure is high, such as at high power operation, and the inlet pressure to the third stream is low, such as low Mach points. The result would be cessation of flow of air, or insufficient flow of air, in the third stream duct under these flight conditions, which could result in stagnation of air flow in the third stream duct and even backflow of gases (reversal of flow). Stagnation of the third stream flow air can lead to stall conditions on the blade-on-fan arrangement under certain circumstances, resulting in possible hardware damage and additional drag on the aircraft due to fan inlet spill drag.

What is needed is an arrangement in which the third stream duct air can be exhausted continuously so that there is no cessation or significant reduction of air flow in the third stream duct or in the FLADE™ duct at any operational conditions of the engine, as insufficient air flow could adversely affect cooling of heat exchangers or other hardware dependent on third stream air for cooling. Ideally, the third stream duct air flow should be exhausted to a low pressure region in a manner that will add thrust and operability to the aircraft.

BRIEF DESCRIPTION OF THE INVENTION

An aircraft engine for a high performance military aircraft is provided. High performance military aircraft include but are not limited to fighters and reconnaissance aircraft. The high performance aircraft engine of the present invention includes a third stream duct producing a third air stream at reduced pressure. This third stream air is exhausted through a separate nozzle that is concentric with the main nozzle. The core stream and bypass are exhausted through the primary exhaust nozzle and the third stream air is exhausted separately through a secondary nozzle. The third stream air from the separate concentric nozzle is exhausted to a location at which the pressure is ambient or sub-ambient. The location at which the third stream air is exhausted should allow contribution to the thrust of the aircraft, so that high efficiency is maintained. The air stream from the third air duct or FLADE™ duct is exhausted through an exhaust nozzle aft of the third duct or FLADE™ duct, also referred to as a secondary nozzle. This third stream exhaust nozzle is positioned at the interface between the aft of the airframe and the leading edge of the engine outer flaps. Some engines that are housed in an engine bay have a bay ventilation slot, and the third stream exhaust nozzle is positioned adjacent to the bay ventilation slot between the engine nozzle and the airframe. In both variations, third stream air of FLADE™ duct air exhausts through the secondary nozzle over the outer flap(s).

By exhausting the third air stream through the secondary exhaust nozzle over the outer flaps, significant improvements in engine operation over a conventional turbofan engine can be realized. The third air duct or FLADE™ duct can provide increased cooling capacity without concerns for air stagnation or backflow due to the low pressure of the air, since this low pressure air, which is still above ambient, can be expelled. The heat exchangers can reliably be depended upon to provide extensive cooling to electrical systems.

The exhaust of third stream or FLADE™ air allows the core to run at higher temperatures since the reliable supply of cooler third stream cooling air allows for protection of the turbine. Heat exchangers in the third stream can be used to reduce the temperature of the turbine cooling air and allow the turbine hardware to survive in the increased temperature environment.

Finally, the third duct or FLADE™ duct now can be relied upon not only to exhaust the cooler, low pressure third stream air or FLADE™ duct air continuously, but also to intake the air at the inlet. The third duct or FLADE™ duct now accepts much of the inlet wall distortion and minimizes the inlet distortion on the fan, the core or bypass air. This allows the fan and core/compressor to operate with less stall margin. When the fan and core operate at less stall margins, the engine can operate at higher pressure ratios, which translates into greater thrust and efficiency. Also, the exhausting of air through the nozzle of the third stream duct or FLADE™ duct over the outer flaps additionally reduces boat tail drag while producing a more stable flow field over the outer flaps.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is a velocity vector diagram in the region of the outer flap.

DETAILED DESCRIPTION OF THE INVENTION

Figure 1:
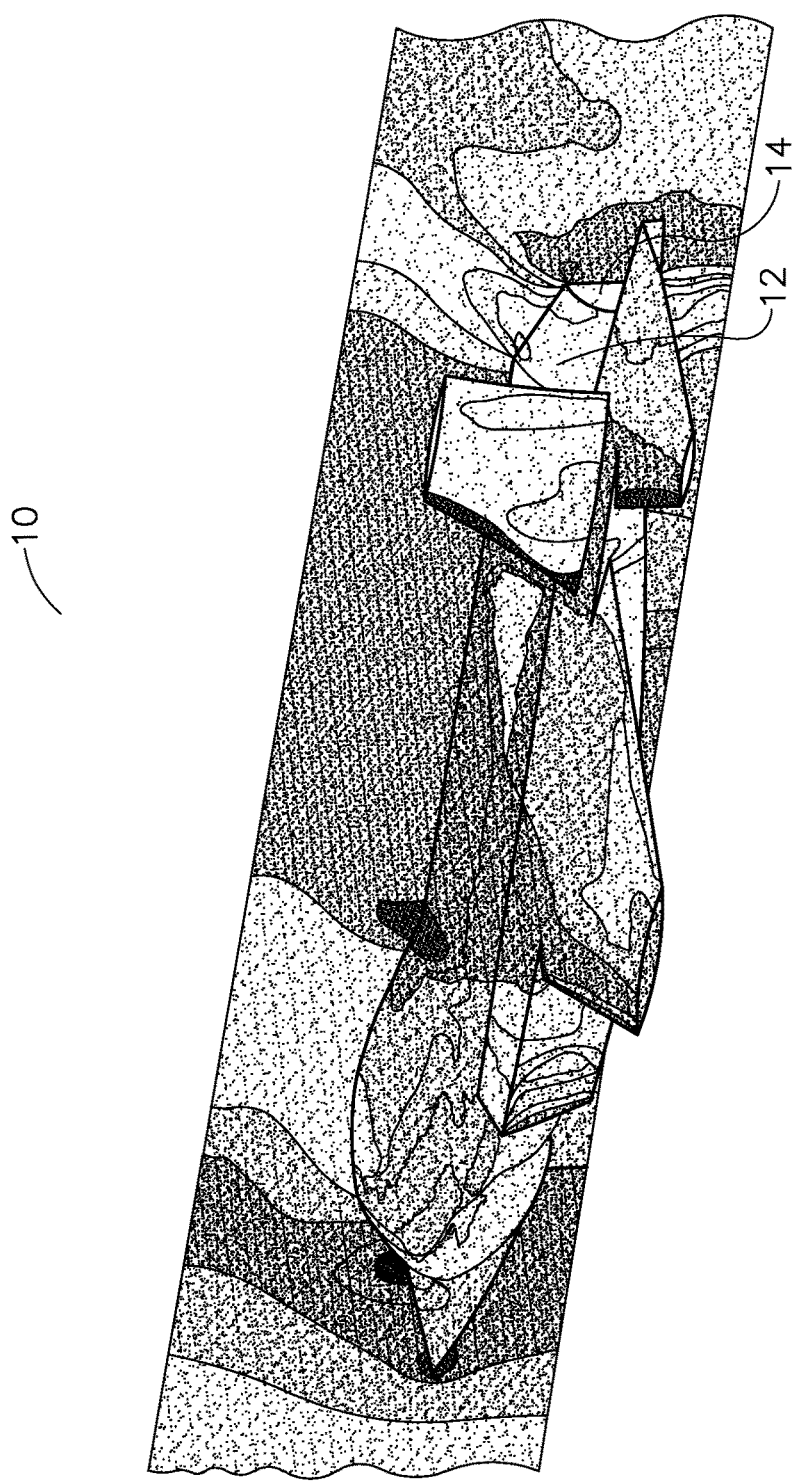
FIG. 1 is a depiction of a jet aircraft showing the varying pressure across the aircraft for a given flight condition.
Figure 1:
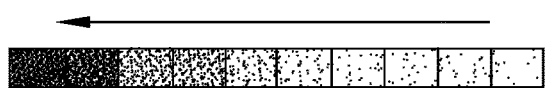

In modern fighter aircraft, the engine may be installed in an engine bay of the aircraft, and a gap exists between the engine and the aircraft structure. Air flows through this gap and the air flowing though this gap exits or exhausts at the leading edge of the outer flaps where the air pressure is at ambient or sub-ambient conditions. FIG. 1 depicts the pressure contours along the exterior of a jet 10. The low pressure region is shown along outer flaps 12 of engine 14 at a predetermined speed.

Figure 4:
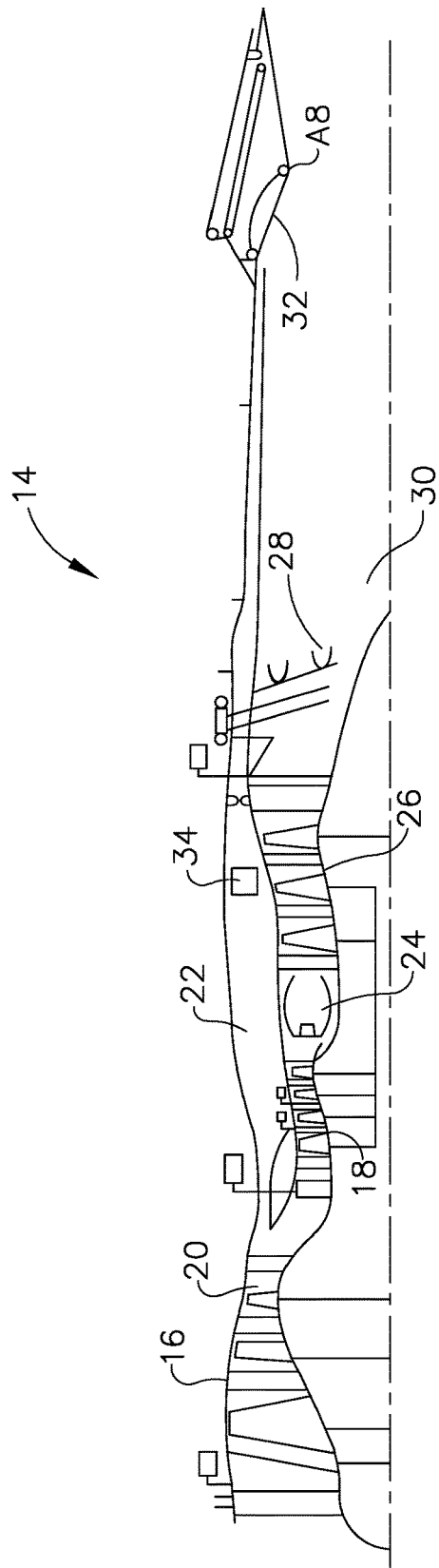
FIG. 4 is a cross-section of a prior art turbofan engine having a core air stream and a bypass air stream.
Figure 5:
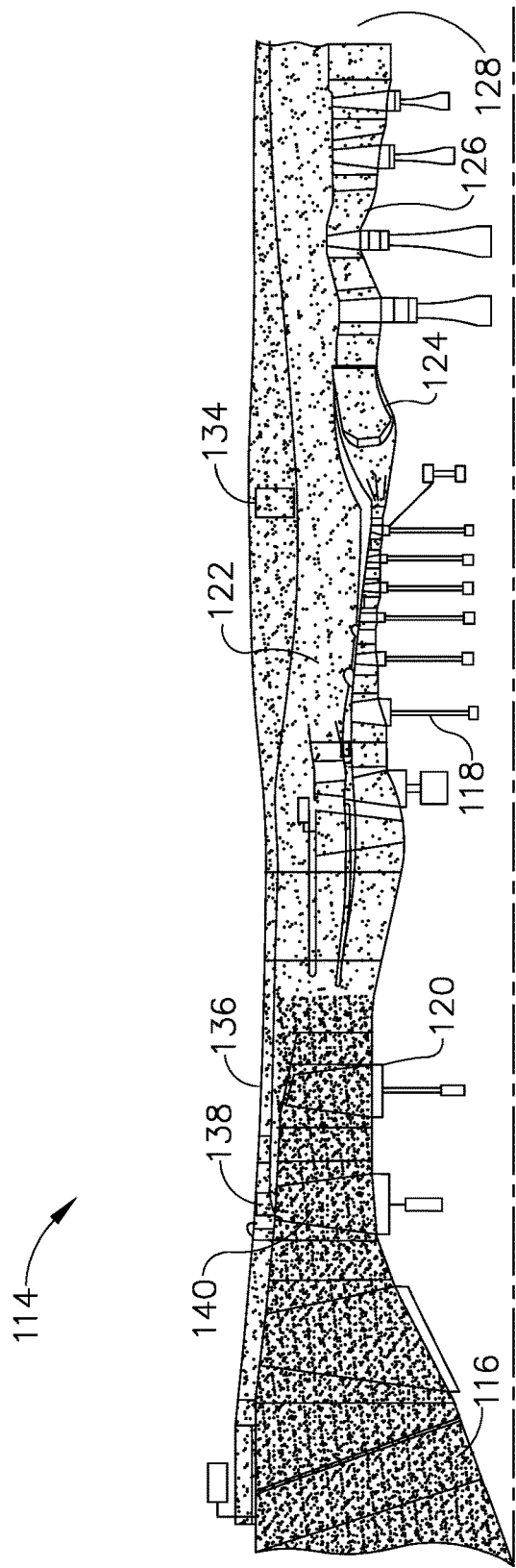
FIG. 5 is a cross-section of an engine equipped with the third stream duct of the present invention showing air flow in the engine fore of the exhaust.

The differences between the turbofan of the present invention having the FLADE™ air stream and a conventional turbofan engine having two airstreams can be appreciated with reference to FIG. 5, which depicts a turbofan that includes a FLADE™ duct or third stream duct and FIG. 4, which depicts a conventional turbofan engine. FLADE™ duct and third stream air duct, as well as FLADE™ air stream and third air stream may be used interchangeably herein, the differences between the two being the pathway that cooling air enters the duct. However, the structures and methods set forth herein are directed to exhausting air from the duct. Hence, the terms are used interchangeably.

In FIG. 4, air is drawn into engine 14 through a multi-stage fan portion 16. As depicted in FIG. 4, fan portion has three stages, although it will be understood that fan portion 16 may include more or less than three stages. Downstream of fan portion 16 is compressor portion 18. After the third fan stage 20, air is split between a bypass duct and compressor portion 18, core air being channeled to compressor portion 18 and bypass air being channeled to bypass duct 22.

Core air proceeds through engine 14 in the manner well known by those skilled in the art. Core air is fed from compressor portion 18 into combustor portion 24, where it is mixed with fuel and burned. The hot gases of combustion then flow to turbine portion 26 where they are expanded. An augmenter portion 28 resides aft of turbine portion 26 and is available to provide additional power as needed, on demand, although it is not normally operational during cruise mode of flight. Augmenter portion 28 is positioned at the front of exhaust portion 30 of engine 14, which receives the hot gases of combustion as they exit turbine 26. At the aft of exhaust portion 30 is a nozzle 32, which is a convergent-divergent (C-D) nozzle. Hot gases passing through nozzle 32 provide thrust to move the aircraft forward. The minimum nozzle diameter is designated in FIG. 4 by A8.

Bypass air passing through bypass duct 22, as shown in FIG. 4 passes through heat exchangers 34 and along the exterior of exhaust portion 30 where it may be used to cool exhaust hardware. Bypass air is shown being diverted into bypass duct 22 aft of third fan stage 20, although it may be diverted at an earlier or later stage, depending on predetermined factors. In cruise mode, the bypass air flows to nozzle 32 where it exits and contributes to engine thrust. Under augmented flight mode, some of the bypass air is diverted into augmenter portion 28 where it is mixed with fuel and combusted for augmented flight.

Core and fan air in augmented turbofan engine can be further spilt to form a third stream of air flowing through a third duct, which is sometimes referred to as a FLADE™ duct when the air is supplied to the third duct using a blade-on-fan arrangement. Alternately, the third stream may be bled from the fan at a fan stage fore or prior to the fan stage that provides bypass air, so that the third stream duct and its air supply are not referred to as a FLADE™ stream. Since the present invention is directed to exhausting air from the third duct, it is of no consequence whether the air in the third duct is sourced from a blade-on-fan arrangement or by diverting air flow from a fan stage fore of the source of bypass air. Any arrangement that utilizes a third duct 136 which bleeds air from the fan portion of the engine can be used in the present invention. The air that is bled to the third duct, or otherwise supplied to the third duct, must have a lower pressure and temperature than the air that is utilized as bypass air. This means that the third duct must be pressurized less than the bypass air. A convenient way of accomplishing this task is to bleed air or pressurize air from a fan stage that is forward of the fan stage used for bypass air, as this air will be at a lower temperature and pressure. As depicted in FIG. 5, for example, third duct air is pressurized by a blade-on-fan attachment 138 associated with the second fan stage 140, although air bled from second fan stage 140 would also be effective, while bypass air is pressurized by bleed air from third fan stage 120. Any other arrangement in which air supplied to third duct 136 is sourced from a fan stage that is fore of the fan stage for air supplied for bypass air will be effective. The selection of which stage air for third duct 136 is drawn is a trade-off, as higher fan stages provide air at higher temperatures and pressures. Higher temperatures adversely affect the cooling potential of the air in the third duct 136, while higher pressures provide more thrust from the secondary nozzle. FIG. 5, a cross-section of engine 114 of aircraft 10, depicts a FLADE™ arrangement in which third stream air enters the third duct at the fan portion of the engine. Core and bypass portions of the engines in FIGS. 4 and 5 operate in substantially the same way. Similar portions in both engines have the same last two digits in the Figures. The third duct in the FLADE™ arrangement and the air flowing through it are sealed from the core air and bypass air. The pressure of this third stream of air is increased using the blade-on-fan arrangement 138 of FLADE™ airfoil in the third duct 136. Inlet Guide Vanes (IGVs) assist in controlling the flow of air into FLADE™ duct 136. When the engine is operating under cruise and loiter conditions, the FLADE™ IGVs are rotated into a position to maximize the flow of air into the FLADE™ duct. Under high cruise conditions and augmentation, these physical settings are reversed, with the FLADE™ IGVs rotated into a position to minimize the air flow into the FLADE™ duct.

Prior art third stream air flows have been exhausted into the core exhaust either just fore or aft of the C-D nozzle. However, placement of the heat exchangers 134 as shown in FIG. 5 to take advantage of the low temperatures of the cooler air flowing in the third stream duct 136 or FLADE™ duct have resulted in pressure drops of the air in the third stream duct 136 or FLADE™ duct. The changes in pressure by the introduction of heat exchangers have resulted in the inability to exhaust the third stream air into the core exhaust under some conditions or at other typical third stream exhaust locations because the sink pressure at this location is too high. It has been discovered that when third stream air is exhausted at this location, there has been an unacceptable cessation of air flow in the third stream duct under some flight conditions.

In FIG. 5, in which the air flow forward of the augmentor is depicted, the air being drawn into FLADE™ duct 136 has its pressure increased by the operation of blade-on-fan attachment 138 located at second fan stage 140. The air in FLADE™ duct 136 is at a lower temperature and pressure than the air in bypass duct 122. As previously noted, third stream air may also be diverted into third stream duct 136 fore of the diversion of bypass air into bypass duct 122. This third air stream or FLADE™ stream has increased cooling capability and can be used to cool extensive electrical systems, to improve hardware durability and to reduce inlet distortion from the fan or engine core allowing the fan/core to run with less stall margin. However, the reduced pressure of the FLADE™ air stream keeps it from being introduced in the core/bypass air stream and being accelerated through the C-D nozzle at all flight conditions in a manner that would contribute to thrust. In such a configuration, when the reduced pressure of the FLADE™ air stream prevents flow into the C-D nozzle, air backs up in FLADE™ duct 136 thereby preventing FLADE™ air flow. In some circumstances, the backpressure is higher than the third stream pressure, resulting in flow reversal that can produce damage to components in communication with third duct 136. An alternate configuration that simply "dumps" the third stream air to the atmosphere at ambient pressure is not a desirable solution, as this imposes a serious penalty on both performance and efficiency.

Because of the low pressures that exist in third duct 136, discharge of air from third duct 136 must be accomplished at a location where pressure is lower than in duct 136, but at a location at which a contribution may be made to thrust. Ambient or subambient pressure exists at most, if not all, engine cycle conditions at the interface between the engine and the nozzle. In modern fighter aircraft, the engine may be installed in an engine bay of the aircraft, where a gap typically exists between the engine and the aircraft. For a military engine having a variable cycle engine, the discharge of third stream air over the leading edge of the outer flaps may be successfully accomplished. Because this location allows a significant component of the exhaust flow to be directed axially aft, and the pressure ratio through the nozzle is generally high enough to choke the nozzle, the nozzle can be designed with a high thrust coefficient and efficiently contribute to the total thrust of the engine.

Figure 2:
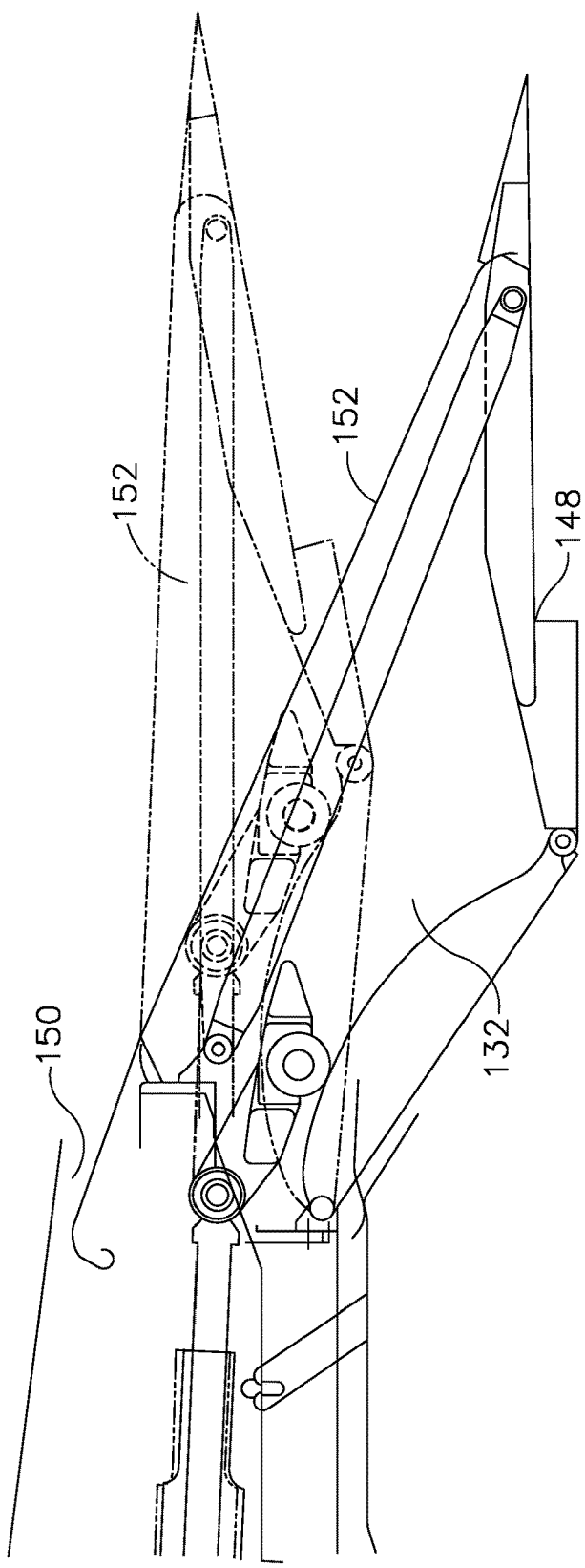
FIG. 2 is a cross sectional view of the exhaust portion of a jet engine also depicting the airframe trailing edge and bay ventilation slot, showing the outer flaps in two different positions, a first position with maximum throat area corresponding to augmented engine operation and a second position with minimum throat area corresponding to max dry power or loiter engine operation.

FIG. 2 depicts the rear end of engine 114, showing bay ventilation slot 150, in an aircraft having an engine bay. It also shows one outer flap 152 in two different positions, where A8, the area of the exhaust nozzle at this location, is at a minimum so that the exhaust has minimum throat area (depicted with solid lines), such as occurs under max dry power conditions, and at maximum throat area (depicted with dashed lines) such as occurs under augmented flight conditions. It will be understood that primary nozzle 132 is comprised of a plurality of outer flaps 152. The flow of air through ventilation slot 150 is insignificant relative to the free stream velocity of gases.

Figure 3B:
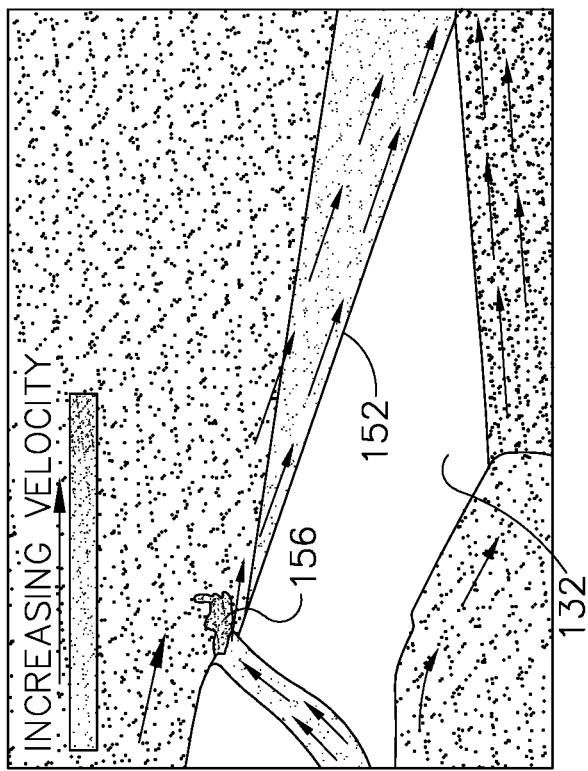
FIG. 3(b) depicts the profile in accordance with the third duct exhaust nozzle of the present invention.
Figure 3A:
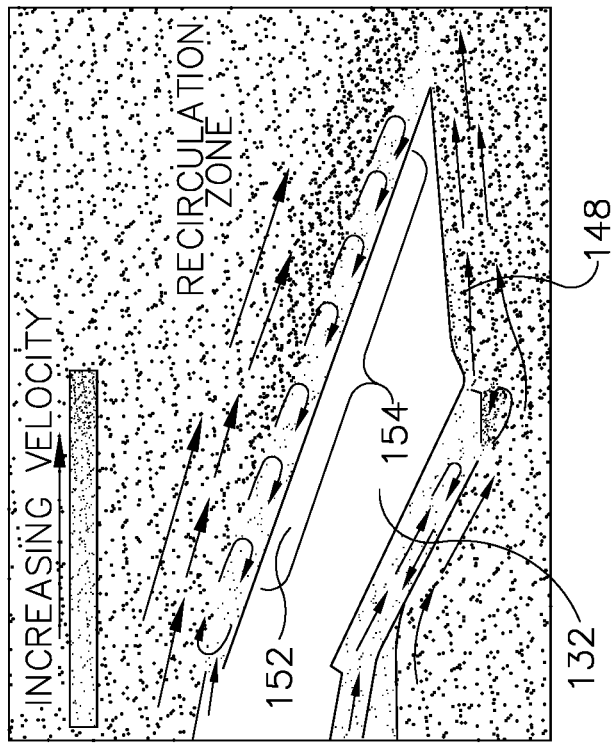
FIG. 3(a) depicts the profile in accordance with a prior art third duct exhaust.

In military aircraft with or without a bay ventilation slot in the location shown in FIG. 2, the aircraft trailing edge is fixed at a large enough radius to fit linkages and piping required for proper engine operation. As the nozzle area A8 varies, outer flap 152 rotates, creating a sharp angle in the external flow path under certain operating conditions. Configurations with bay slot 150 in the location shown in FIG. 2 have an additional step in the external flow path. Because the air through the bay ventilation slot is negligible, the slot in effect creates a step in the flow path of the free stream air passing around the airframe. This step produces a low pressure for exhaust of air from third duct 136. FIG. 3 is a vector diagram showing airflow over outer flap 152. As FIG. 3 illustrates, the step can lead to flow separation, creating a recirculation zone 154. This is depicted in FIG. 3(*a*) and results in a loss in total pressure in the flow over outer flaps 152. This loss of energy is characterized through boat tail drag.

Figure 6:
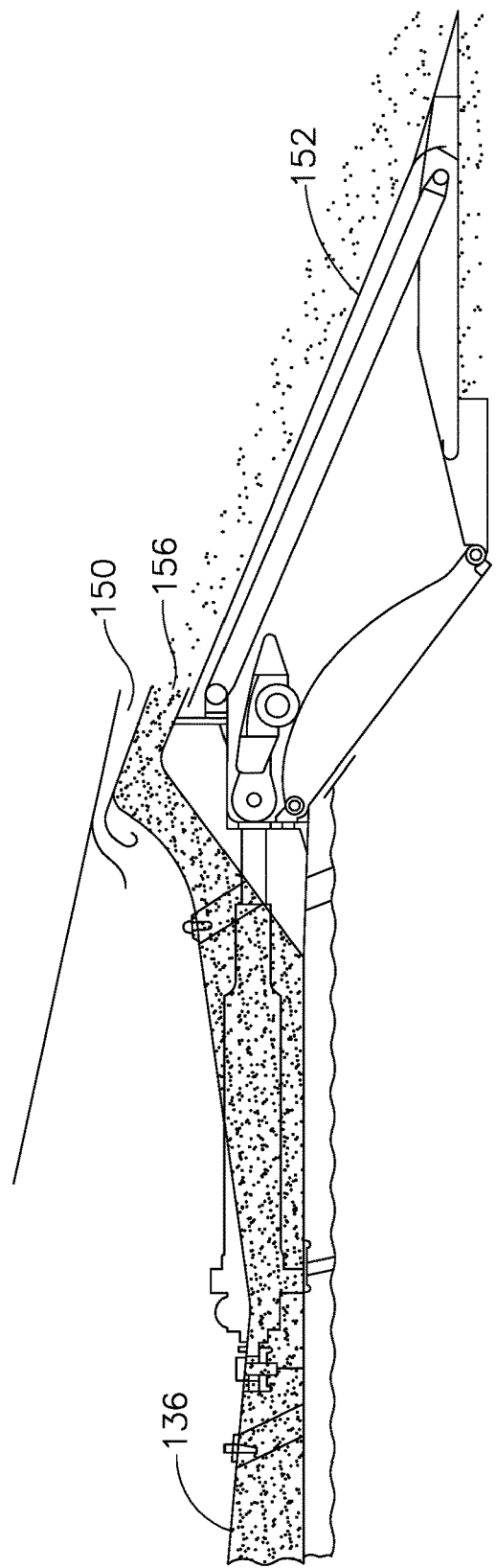
FIG. 6 is a cross-section of an engine equipped with the third stream duct of the present invention showing the third stream air duct or FLADE™ duct exhausting third stream air through the third stream nozzle adjacent to the bay slot over the outer engine flap(s).

The third duct or FLADE™ duct 136 can exhaust to the step, taking advantage of the low pressure zone over outer flaps 152. Because the third stream flows more air with more energy than the bay slot, the third stream nozzle can reduce or eliminate the recirculation zone. FIG. 6 depicts exhaust nozzle 156 of third duct 136 exhausting third stream air over outer flaps 152. In some aircraft designs, this exhaust may occur adjacent to bay ventilation slot 150. When exhausting the third stream air over outer flaps 152, the pressure ratio is sufficiently high to choke the flow at most cycle conditions. This flow fills the low pressure region depicted as recirculation zone 154 (dark blue area) in FIG. 3(*a*). Referring now to FIG. 3(*b*), the air flow from third duct nozzle exhaust 156 over outer flaps 152, as shown in FIG. 6, reduces or eliminates the recirculation zone. This creates a stable flow over outer flaps 152 and reduces their sensitivity to the effects of the free stream air interacting with the airframe. If third duct nozzle 156 is a convergent-divergent design, then at key specific fuel consumption (SFC) points such as cruise, the nozzle accelerates airflow such that the exhaust pressure is nearly equal to the sink pressure. If third duct nozzle 156 is a convergent only design, then flow will exit with a higher static pressure than the sink, but will quickly expand to equal the sink pressure. However, the total pressure over the outer flaps is higher than in prior art configurations. For some subsonic free stream conditions such as cruise, as the flow passes over the flaps and mixes out, the velocity of the higher energy third stream air decreases and the static pressure increases. This may result in higher overall pressure over flaps 152.

The arrangement can be analyzed using a simplified controlled volume formulation. The pressure on the outer flaps creates an axial force on the nozzle equal to $P_{flap} - P_{ambient} * A_{flap} \times \sin \theta$, where $P_{flap}$=pressure exerted on the outside surface of the flap, $P_{ambient}$=pressure exerted on the inside surface of the flap, $A_{flap}$=the flap surface area, and $\theta$ is the angle between the outer flap and the axial coordinate. Increasing the outer flap pressure therefore results in an increased axial thrust force. This increase in axial thrust force can balance or even outweigh the loss in thrust recovery caused by an inability to mix the third stream air (FLADE™ air) with the core stream. The exhaust nozzle 156 of third stream duct (FLADE™ nozzle) may have a fixed throat area, vary in area dependently with the primary core nozzle throat area, or vary independently depending on cycle needs.

The arrangement shown in FIG. 6 exhausts all third stream air through exhaust nozzle 156. The use of exhaust nozzle 156 for this purpose permits the elimination of the divergent slot, which, in some prior art configurations, is used to exhaust third stream air into primary exhaust nozzle 132. A divergent slot 148, FIG. 3, introduces a divergent slot step into the C-D nozzle, which can reduce the nozzle thrust coefficient by around 0.005 at most flight conditions. Because the divergent slot step makes it difficult, if not impossible, to create a divergent section that is optimized to the most efficient nozzle expansion ratio, the use of secondary nozzle 156 while eliminating divergent slot 148 permits both the primary and secondary nozzles to be optimized for better efficiency. The elimination of divergent slot 148 also eliminates a path for hot gases to return or backflow to third duct 136, because the flow path connecting the third duct to the primary nozzle is eliminated.

Figure 7:
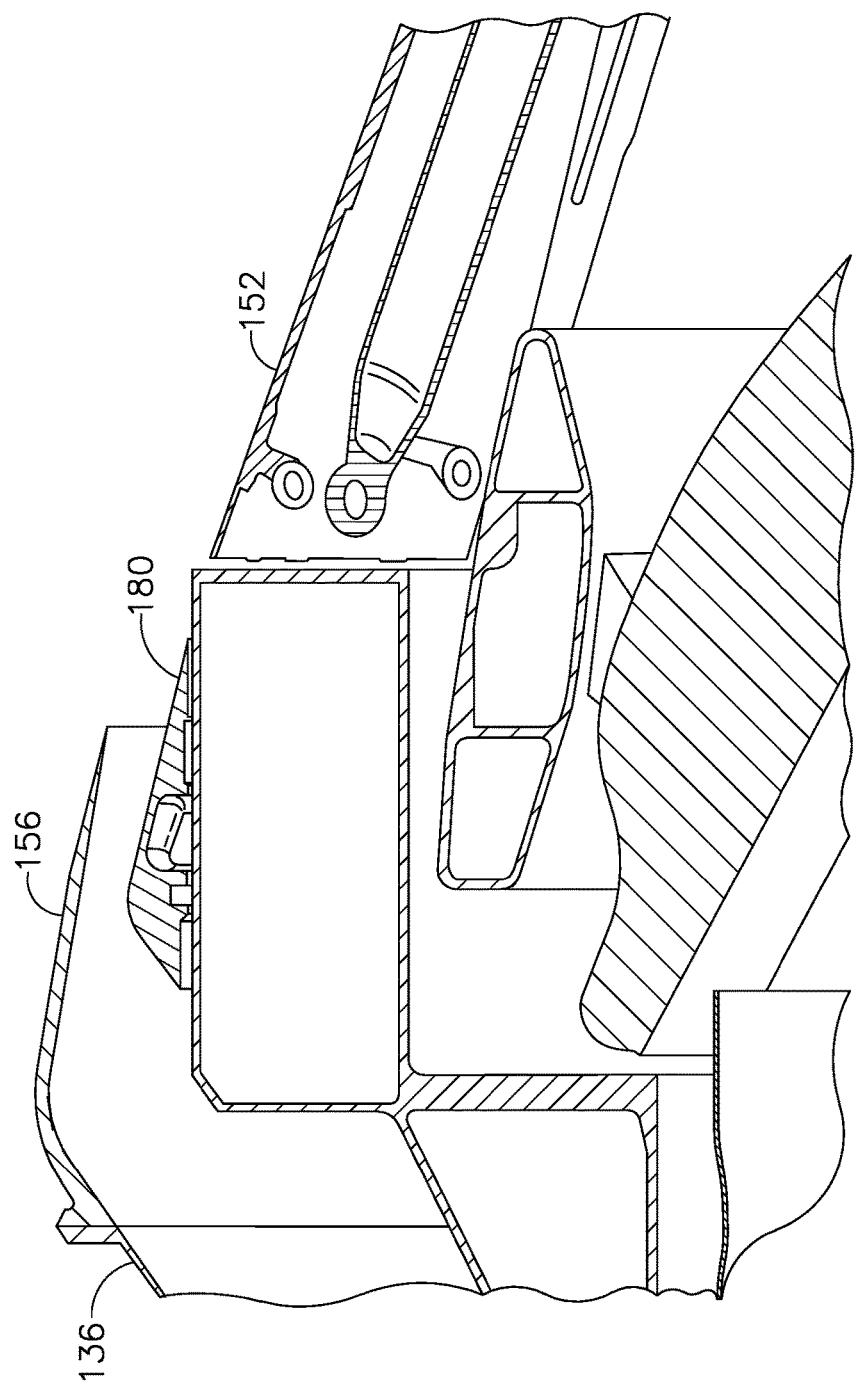
FIG. 7 depicts a variable exhaust nozzle for a third stream duct or FLADE™ duct that includes a nozzle valve to vary the exhaust gas exit area.

The third stream nozzle 156 is located at the aft end of third stream duct 136. Nozzle 156 may be integral with duct 136, or may be a separate attachment affixed to duct 136. It may be comprised of the same material as third stream duct or may be comprised of a different material. Thus, the third stream nozzle may be comprised of a polymer matrix composite, a ceramic matrix composite or a metal, the selection being a design and repair/replacement consideration Third stream duct 136 also may include a valve that varies the flow of third stream air exiting exhaust nozzle 156. FIG. 7 shows a section view of a secondary nozzle control valve. This valve 180 may be passive or active. When valve 180 is passive, it is controlled by the pressure of the air flowing through exhaust nozzle 156. Thus, valve 180 may be biased so that when the pressure of third stream air flowing through exhaust nozzle 156 is high, such as occurs under augmentation or high cruise speeds, valve 180 moves aft (with respect to the engine) within exhaust nozzle 156, decreasing the area available for the third stream air to be exhausted. When the pressure of third stream air flowing through exhaust nozzle 156 decreases, such as occurs at cruise, low cruise and loiter conditions, valve 180 is biased to move forward within nozzle 156, allowing more air flow as the throat area in nozzle 156 is increased when valve is biased into this position.

Valve 180 may be an active valve. In this circumstance, valve 180 may be in communication with a controller or with an engine Full Authority Digital Engine Control (FADEC™). When a separate controller is utilized, the controller may be in communication with pressure sensors sensing the pressure of the air in nozzle 180. The position of valve 180 may be controlled by a motor or actuator that moves the valve based on instructions from the controller to a preprogrammed position depending upon the sensed air pressure in the third nozzle. Alternatively, the motor or actuator may move the valve to a predetermined position based on instructions from an engine FADEC™ based on the engine condition dictated by the engine FADEC™ (i.e. augmentation, cruise, or some intermediate position).

Thus, the disclosure utilizes a third air stream for cooling and exhausts the third air stream by use of a third stream exhaust nozzle 156, which exhausts the low pressure third stream air to an available but even lower air pressure found over the outer flaps adjacent to the interface between the airframe and leading edge of the engine outer flaps. The exhaust of third stream air thus is independent of the mode at which the engine is operating. If desired, nozzle 156 of third stream duct 136 may be equipped with valve 180 that allows the flow of air from nozzle 156 to be varied.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An aircraft turbofan engine having a fan portion providing three streams of air flow to the aircraft turbofan engine through an outer fan air duct, which is co-annular with and circumscribes an inner fan duct, which in turn, is co-annular with and circumscribes an engine core, comprising:
   a primary nozzle, wherein combustion fluid is exhausted after core air flow from the fan portion forming a first stream of air is combined with fuel and combusted to form the combustion fluid, the primary nozzle including a plurality of outer flaps and seals;
   the inner fan duct forming a bypass duct wherein bypass air flow forming a second stream of air is exhausted through the primary nozzle; and
   the outer fan duct forming an air duct receiving a third stream of air flow, the air duct having an air inlet and an air outlet, the air outlet of the air duct further comprising a secondary nozzle that is concentric with the primary nozzle and positioned at a leading edge of the outer flaps of the primary nozzle, wherein the secondary nozzle is positioned to exhaust the third stream of air over the radially outer surface of the outer flaps of the primary nozzle to a location having a pressure that is lower than a pressure of the third stream of air in the secondary nozzle.

2. The aircraft turbofan engine of claim 1 wherein the aircraft turbofan engine further includes an augmenter.

3. The aircraft turbofan engine of claim 1 wherein the third stream of air has a pressure that is above ambient and is exhausted through the secondary nozzle to a location having a pressure that is at ambient pressure or lower.

4. The aircraft turbofan engine of claim 1 wherein the aircraft turbofan engine further resides in an engine bay, a bay ventilation slot formed at an interface between an aft location of the engine bay and the leading edge of the plurality of outer flaps of the aircraft turbofan engine.

5. The aircraft turbofan engine of claim 1 wherein the air duct is supplied with air by a fan-on-blade attachment to the fan portion.

6. The aircraft turbofan engine of claim 1 wherein the air duct is supplied with air by diversion of air from the fan portion of the aircraft turbofan engine fore of a diversion of bypass air to the bypass duct from the fan portion.

7. The aircraft turbofan engine of claim 1 wherein the third stream of air has a lower pressure and temperature than the bypass air flow.

8. The aircraft turbofan engine of claim 1 wherein the third stream of air provides cooling capacity for engine operation.

9. The aircraft turbofan engine of claim 1 wherein the secondary nozzle is integral with the air duct.

10. The aircraft turbofan engine of claim 1 wherein the secondary nozzle is attached to the air duct.

11. The aircraft turbofan engine of claim 1 wherein the secondary nozzle comprises a material selected from a group consisting of ceramic matrix composites, polymer matrix composites and metals.

12. The aircraft turbofan engine of claim 1 wherein the secondary nozzle is a variable nozzle.

13. The aircraft turbofan engine of claim 12 wherein the variable secondary nozzle further includes a valve movable from a first position to a second position to vary an exhaust area of the secondary nozzle.

14. The aircraft turbofan engine of claim 13 wherein the variable secondary nozzle is a passive valve, wherein the passive valve is movable from a first position to a second position responsive to the pressure of air in the secondary nozzle.

15. The aircraft turbofan engine of claim 13 wherein the variable secondary nozzle is an active valve, wherein the active valve is movable to a predetermined position responsive to a command from a controller in communication with pressure sensors monitoring air pressure in at least one of the air duct and secondary nozzle.

16. The aircraft turbofan engine of claim 13 wherein the variable secondary nozzle is an active valve, wherein the variable secondary nozzle is movable to a predetermined position based on an operating mode of the aircraft turbofan engine, the operating mode of the aircraft turbofan engine determined by an engine FADEC that is in communication with the variable secondary nozzle.

17. The aircraft turbofan engine of claim 1 wherein the secondary nozzle provides exhaust contributing to engine efficiency.

18. The aircraft turbofan engine of claim 17 wherein the secondary nozzle exhaust contributes to engine efficiency by generating an axial component of thrust.

19. The aircraft turbofan engine of claim 1 wherein the secondary nozzle exhaust further contributes to engine efficiency by exhausting the third stream of air over the outer flaps, reducing a recirculation zone over the outer flaps.

20. The aircraft turbofan engine of claim 19 wherein reducing the recirculation zone over the outer flaps reduces or eliminates boat tail drag on an airframe.

* * * * *